United States Patent [19]

Niebanck et al.

[11] 4,142,698
[45] Mar. 6, 1979

[54] IMPROVED AIRCRAFT SUSPENSION SYSTEM WITH MECHANISM OPERABLE TO ESTABLISH SYSTEM VERTICAL STIFFNESS AND DAMPING AND MECHANISM OPERATIONALLY INDEPENDENT THEREOF TO ESTABLISH SYSTEM ROLL STIFFNESS AND DAMPING

[75] Inventors: Charles F. Niebanck; Steven A. Klusman, both of Stratford; Irwin J. Kenigsberg, Trumbull, all of Conn.

[73] Assignee: United Technologies Corporation, Hartford, Conn.

[21] Appl. No.: 747,458

[22] Filed: Dec. 3, 1976

[51] Int. Cl.² .............................................. B64C 25/60
[52] U.S. Cl. ............................... 244/17.17; 244/104 R
[58] Field of Search .......... 244/17.17, 104 R, 104 FP, 244/104 CS, 104 LS; 180/41; 280/6 R, 6 H

[56] References Cited

U.S. PATENT DOCUMENTS

| | | | |
|---|---|---|---|
| 2,139,192 | 12/1938 | Krekel | 244/104 FP |
| 2,326,210 | 8/1943 | Falk et al. | 244/104 R |
| 2,774,553 | 12/1956 | Jensen | 244/17.17 |
| 2,933,271 | 4/1960 | Maltby | 244/17.17 X |
| 3,042,345 | 7/1962 | Holland | 244/104 R |
| 3,173,632 | 3/1965 | Woods | 244/17.17 X |

FOREIGN PATENT DOCUMENTS

| | | | |
|---|---|---|---|
| 441432 | 1/1936 | United Kingdom | 244/104 R |
| 745915 | 3/1956 | United Kingdom | 244/104 R |

*Primary Examiner*—Barry L. Kelmachter
*Attorney, Agent, or Firm*—Vernon F. Hauschild

[57] ABSTRACT

A passive aircraft landing gear system in which the spring rate and damping for aircraft rolling motions about a longitudinal axis are independent of the spring rate and damping for aircraft vertical motions, thereby permitting the landing gear system to optimally accomplish both landing impact attenuation and ground resonance instability abatement.

4 Claims, 3 Drawing Figures

4,142,698

IMPROVED AIRCRAFT SUSPENSION SYSTEM WITH MECHANISM OPERABLE TO ESTABLISH SYSTEM VERTICAL STIFFNESS AND DAMPING AND MECHANISM OPERATIONALLY INDEPENDENT THEREOF TO ESTABLISH SYSTEM ROLL STIFFNESS AND DAMPING

BACKGROUND OF THE INVENTION

1. Field of the Invention

This invention relates to aircraft suspension and landing gear systems, particularly for use with helicopters, wherein the system vertical stiffness and damping are sufficiently high to attenuate landing impact loads and wherein the system roll mode stiffness and damping are sufficiently soft as to permit the avoidance of ground resonance instability.

2. Description of the Prior Art

In the aircraft suspension and landing gear art, serious compromises have been made in the past between the system stiffness and damping required for load impact attenuation and the conflicting system stiffness and damping required for ground resonance instability abatement, such that both purposes suffered thereby. This was so because the prior art does not include an aircraft suspension and landing gear system in which the system roll mode stiffness involved in avoiding ground resonance instability may be established independent of the stiffness of the system involved in landing impact attenuation.

While the structure of Holland U.S. Pat. No. 3,042,345 and Maltby U.S. Pat. No. 2,933,270 bear a superficial resemblance to the construction of this invention, it should be borne in mind that neither of these patents has a construction which accomplishes ground resonance abatement. The Holland patent seeks to obtain better aircraft controllability in cross winds and on sloping grounds and the Maltby patent is an active, servo actuated system with substantial roll stiffness.

Other prior art bearing a superficial resemblance to the aircraft suspension and landing gear system shown herein is directed to the problem of being able to land a helicopter on uneven ground while maintaining the helicopter level due to the accommodating motions of the landing gear.

SUMMARY OF THE INVENTION

The primary object of the present invention is to provide an aircraft suspension and landing gear system in which the dynamic properties of the system attenuating landing impact may be selected independently of the dynamic properties of the system reacting roll motion so that both may be accomplished successfully without compromise.

It is a further object of this invention to teach an aircraft suspension and landing gear system which provides differential suspension spring rates and damping for aircraft roll motions, which are independent of the spring rate and damping for accommodating aircraft vertical motions.

It is a further object of this invention to provide such a system in which the vertical motions of the aircraft on the landing gear remain principally controlled by the properties of the wheels, oleo struts, and tires, and wherein the roll motions of the aircraft on its landing gear are controlled principally by the dynamic properties, including spring rate and damping of the portion of the sytem which operates when antisymmetrical vertical loads are produced on the wheels and are inoperative during symmetrical vertical wheel loading mode of operation.

It is still a further object of this invention to teach such a system in which the system roll dynamic properties may be selectively chosen to permit roll frequency and damping to be set at values which will prevent ground resonance, without affecting the dynamic properties of the oleo strut system which are independent thereof and are selected for optimum landing impact attenuation.

It is still a further object of this invention to teach such a suspension system for a helicopter including a conventional wheel and oleo strut system having spring rates and damping selected for optimally withstanding landing impact loads and having an independent system associated therewith whose spring rates and damping is optimally selected for ground resonance avoidance.

It is still a further object of this invention to teach such a system which is passive and in which differential vertical motion occurs between the landing gears, that is, if the aircraft were suspended and one of the landing gears were raised upwardly, the other landing gear would thereby be lowered.

It is an important object of this invention to teach such a suspension and landing gear system in which the vehicle roll frequency can be established well below normal rotor rpm to abate ground resonance and abate one per rev vibration response when the vehicle is on the ground.

DESCRIPTION OF THE PREFERRED EMBODIMENT

Figure 1:
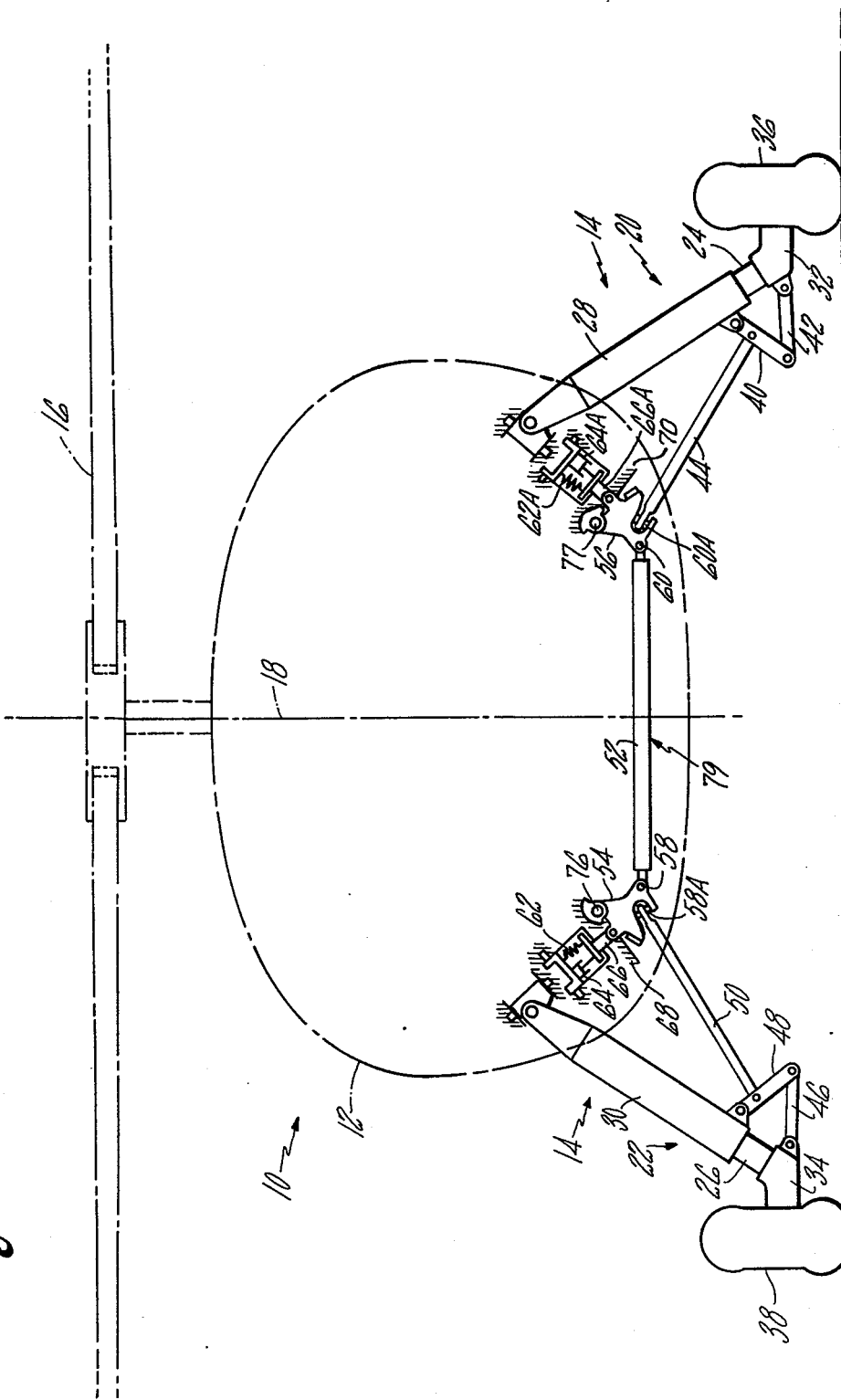
FIG. 1 is a front view of an aircraft, such as a helicopter showing the construction of our suspension and landing gear system.

Referring to FIG. 1 we see aircraft 10, which is preferably a helicopter, and which includes fuselage 12 supported from the ground by our aircraft suspension and landing gear system 14. Main lift rotor 16 projects from fuselage 12 for rotation about its axis of rotation 18 to generate lift and to propel the helicopter 10. Aircraft suspension and landing gear system 14 includes oleo strut systems 20 and 22 which are of conventional design, for example, of the type comprising hydraulic or pneumatic cylinder-piston members. Oleos 20 and 22 include piston members 24 and 26 reciprocating in cylinder members 28 and 30. Piston members 24 and 26 carry wheel support members 32 and 34 therewith, which, in turn, support port and starboard tired wheels or landing gear 36 and 38. For landing gear 36, link members 40 and 42 are pivotally connected to wheel support member 32 and oleo strut 20, respectively, and to each other, while lateral strut 44 is pivotally connected to link 40. Similarly for wheel 38, links 46 and 48 are pivotally connected to wheel support member 34 and oleo 22, respectively, and to each other, and lateral strut 50 is pivotally connected to link 48. Member 52, which is shown as a bar-shaped member but is not necessarily so limited, extends laterally with respect to helicopter 10 and pivotally connects at its opposite ends to pivotal link members 54 and 56, which are in turn pivotally connected to lateral struts 44 and 50 at 60A and 58A, respectively, Member 52 is supported from fuselage 12 by link members 54 and 56, which are pivotally supported from the fuselage at pivot points 76 and 77 and pivotally connect to member 52 and lateral struts 48 and 50 at pivot points 58, 58A and 60, 60A, respectively. Spring members 62 and 62A and damper members 64 and 64A are operatively positioned between fuselage 12 and members 54 and 56, preferably through links 66 and 66A which are pivotally connected to link members 54 and 56, respectively.

It will be noted that link members 54 and 56 and member 52 cooperate with fuselage 12 to form a four-bar linkage 79 and that positive stop member 68 and 70 serve to limit the pivotal motion of links 54 and 56, and hence the four-bar mechanism 79 about fuselage 12.

During ground operation, take-off, or landing when symmetric vertical loading is imposed upon each wheel 36 and 38 and their respective oleo struts 20 and 22, both wheels will tend to move vertically upwardly, or downwardly, with respect to the fuselage and the oleo struts 20 and 22 and the lateral struts 44 and 50 will pivot about fuselage 12 and link members 54 and 56, respectively, to accommodate this motion. During this symmetric loading and hence vertical motion of the landing gears, it will be noted that lateral link 52 does not move and therefore solely the dynamic properties, namely spring rate and damping, designed into the oleo struts and wheels establish the vertical stiffness of suspension system 14.

Since aircraft landing impact loads must be attenuated by system 14 during this symmetric load mode of operation, the spring rate and damping capabilities of th oleo struts and the wheels may be selected and designed in conventional fashion to produce sufficient vertical stiffness to system 14 to comfortably and optimally attenuate these landing impact loads. It is generally preferable to have a vertically stiff system to so attenuate the landing impact loads.

When the helicopter is on the ground with rotor 16 rotating to generate lift during the landing, take-off, taxiing, warm-up or any other mode of operation, and a roll motion is experienced by the helicopter, an antisymmetrical vertical wheel loading will be established, one wheel being loaded to a greater extent than the other, during which mode of operation lateral struts 44 and 50 and link members 54 and 56 will move lateral link 52 laterally toward the higher loaded wheel and this lateral motion of link 52 will be opposed by spring 62 and 62A and damper 64 and 64A, which establish the dynamic properties, that is spring rate and damping, of suspension system 14 with respect to motion of the helicopter roll mode. Since lateral link 52 does not move in the above described symmetric vertical wheel loading mode of operation and is therefore independent thereof, spring 62 and 62A and damper 64 and 64A may therefore be selected exclusively to satisfy the desired helicopter roll mode characteristics.

One cause of helicopter vibration about its rolling axis is known on the ground is known as ground resonance. This is an instability most likely to occur when the difference between the rotational frequency (rpm) of rotor 16 and the blade lag mode frequency, in the rotor, which is the frequency at the fuselage of the rotor blade lead-lag mode, equals the vehicle roll mode natural frequency. This particular distribution of frequencies is referred to hereinafter as roll mode-lag mode coalescence. By properly establishing the dynamic properties of system 14 for antisymmetric vertical wheelload operation in roll mode, the vehicle roll mode natural frequency and damping can be established. This is accomplished by proper selection of spring rate of spring 62 and 62A and damping qualities of damper 64 and 64A. It is an important teaching of our invention that the system 14 spring rate in roll mode be low, thereby producing a suspension system which is soft in its roll mode, to thereby establish a low vehicle roll mode frequency. The vehicle roll mode frequency should be so established well below normal rotor rpm so that roll mode-lag mode coalescence occurs at low rotor rpm. This is desirable because the possible ground resonance roll instability established by this frequency coalescense is weaker at low rpm and can be damped effectively with minimal damping.

Positive stops 68 and 70 are provided to limit the lateral motion of lateral bar 52 during short term periods of severe antisymmetric vertical or lateral wheel loading of the type which might be expected during an uneven landing or take-off. Positive stops 68 and 70 are not engaged when substantially symmetric wheel loading is reestablished.

It will therefore be seen that, as best illustrated in FIG. 1, our aircraft suspension and landing gear system 14 is constructed so that while cross bar member 52 is loaded, its associated four-bar linkage 79 is essentially inoperative during symmetric vertical wheel load mode of operation of the type normally encountered during an aircraft landing operation. Therefore, the dynamic properties of the oleo strut systems and wheels may be designed or selected to produce a vertically stiff suspension system which will optimally attenuate landing impact loads. Further, since lateral bar 52 and four-bar linkage 79 move laterally during rolling motions about the aircraft longitudinal axis, and since the remainder of system 14 serves principally to effect this lateral motion, the dynamic properties, namely spring rate and damping capabilities imparted to link 52 and linkage 79 by springs 62, 62A and dampers 64, 64A, can be selected to produce a suspension system which is soft in rolling about the longitudinal axis and which has the corresponding roll natural frequency sufficiently below normal rotor rpm to thereby produce optimum ground resonance roll instability abatement. We accordingly have a suspension system which is stiff in reacting vehicle vertical motions for symmetric vertical wheel loads and which is soft in reacting vehicle roll motions during antisymmetrical vertical wheel loads because the portions of the suspension system involved in each of these operations are independent in operation from one another.

Our experience has shown that for the S-76 helicopter the vertical spring rate of system 14 is preferably about 1100 lb/in, the roll mode spring rate of system 14 is preferably about 2,500,000 in-lbs/rad, and the roll mode frequency of system 14 is preferably about 1.6 hz.

FIG. 1 illustrates a two wheel suspension system. It will be realized by those skilled in the art that suspension system 14 can be used in conjunction with either a swivel nose or tail wheel.

Figure 2:
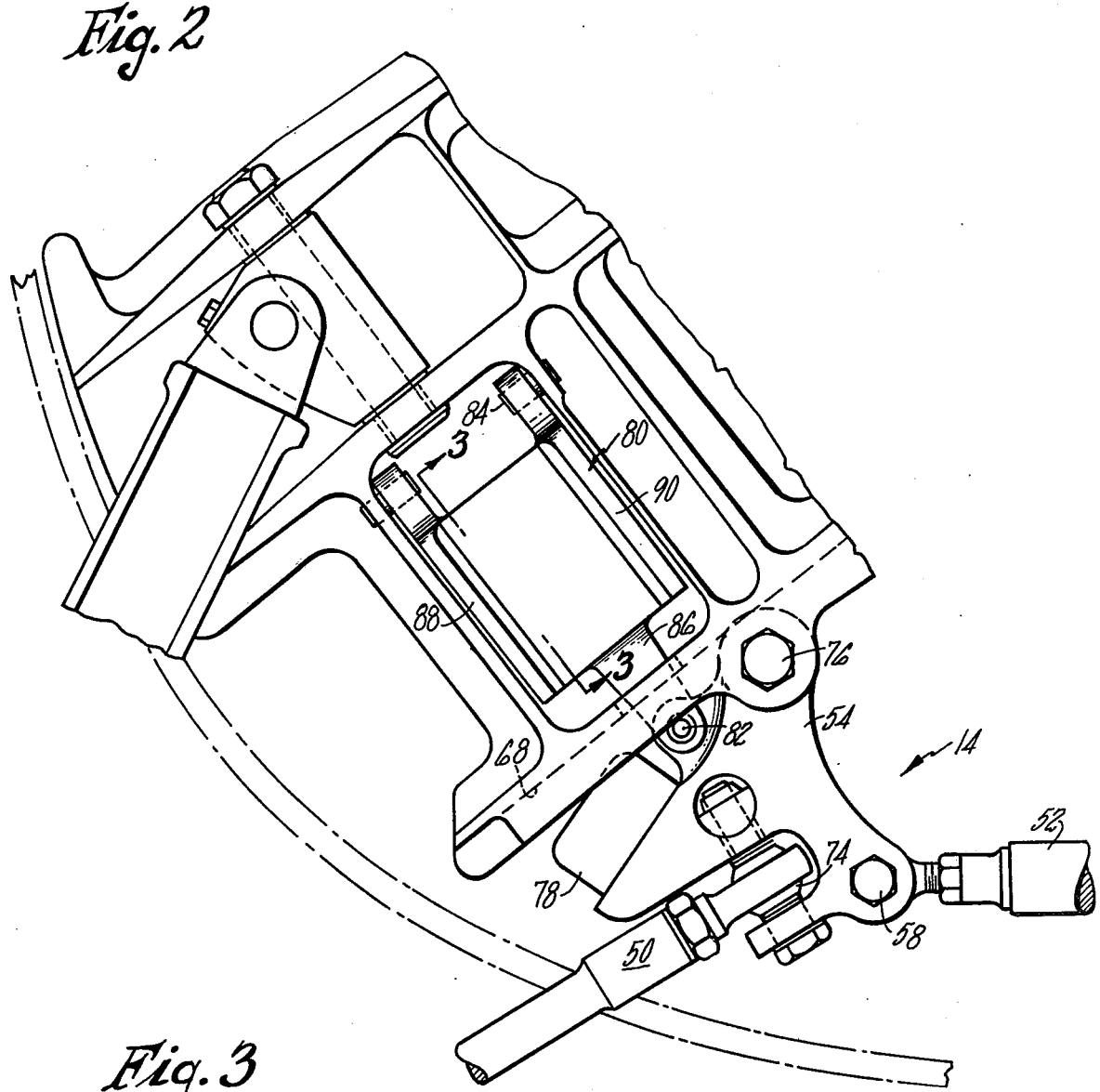
FIG. 2 is a partial showing of a preferred embodiment of this system.
Figure 3:
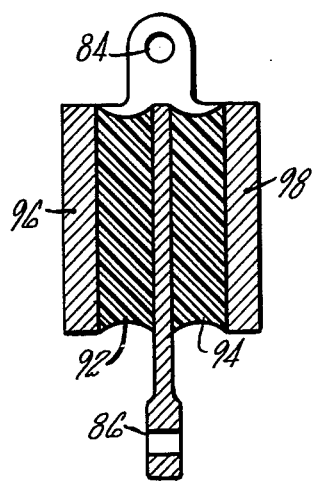
FIG. 3 is a view taken along line 3—3 of FIG. 2.

A preferred embodiment of a portion of suspension system 14 is shown in FIG. 2 and reference numbers corresponding to those used in the FIG. 1 description are used to identify corresponding parts in the FIG. 2 preferred embodiment. It will be noted by viewing FIG. 2 that lateral link 52 is pivotally connected to link member 54 at pivot point 58 and that lateral link 50 is pivotally connected to link 54 through conventional spherical joint 58A. Link 54 is, in turn, connected to fuselage 12 at pivot joint 76. Rubber stop 78 projects from link 54 and after selected pivotal movement of link 54 toward fuselage 12, rubber stop 78 abuts positive stop surface 68 of fuselage 12. Spring-damper assembly 80, which performs the functions of spring 62 and damper 64 in FIG. 1, is pivotally connected to link 54 at pivot joint 82, and is also preferably pivotally connected to fuselage 12 along pivot line 84, for purposes of replacement. Spring-damper assembly 80, as best shown in FIG. 3, includes paddle member 86 positioned between side rail member 88 and 90 and connected thereto through elastomer layers 92 and 94, and cover plates 96 and 98. The elastomer layers are bonded to both the cover plates 96 and 98 and the paddle 86. Accordingly, as link 54 pivots about pivot joint 76, paddle member 86 attempts to translate in one direction or the opposite direction parallel to side rail members 88 and 90, thereby placing elastomer layers 92 and 94 in shear. The properties of the elastomer layers 92 and 94 are selected to establish the dynamic properties, namely the spring rate and the damping capability of suspension system 14 for the vehicle roll mode of operation.

We wish it to be understood that we do not desire to be limited to the exact details of construction shown and described, for obvious modifications will occur to a person skilled in the art.

We claim:

1. In a helicopter having a fuselage and a lifting rotor projecting from said fuselage for rotation about an axis of rotation to generate lift, the improvement of:
   (A) a landing gear and suspension system connected to said fuselage and including,
      (1) first means to establish system vertical stiffness and damping, and
      (2) second means independent of said first means to establish system roll stiffness and damping
   (B) wherein said first means establishes system vertical stiffness and damping sufficient to attenuate landing impact loads and wherein said second means establishes system roll stiffness and damping so that the helicopter roll mode frequency is well below the helicopter rotor normal operating rpm, and
   (C) wherein said first means comprises:
      (1) two wheel members on opposite sides of the fuselage,
      (2) an oleo strut system connecting each wheel member to the fuselage,
      (3) means pivotally connecting each oleo strut system to the fuselage,
      (4) a lateral strut pivotally connected to each oleo strut system, and
   (D) wherein said second means includes:
      (1) a lateral member extending between and pivotally connected to the free ends of each lateral strut,
      (2) link members pivotally connecting opposite ends of said lateral member in pivotal relation from said fuselage, said link members, and said lateral member cooperate to form a four-bar linkage, and
      (3) spring and damper means operatively positioned between said lateral member and said fuselage to establish system roll mode stiffness and frequency.

2. A helicopter according to claim 1 and including positive stop means supported from said fuselage to limit lateral motion of said lateral member.

3. In a helicopter having a fuselage and a lifting rotor projecting from said fuselage for rotation about an axis of rotation to generate lift, the improvement of:
   (A) a landing gear and suspension system connected to said fuselage and including,
      (1) first means to establish system vertical stiffness and damping, and
      (2) second means independent of said first means to establish system roll stiffness and damping
   (B) wherein said first means establishes system vertical stiffness and damping sufficient to attenuate landing impact loads,
   (C) wherein said first means comprises:
      (1) two wheel members on opposite sides of the fuselage,
      (2) an oleo strut system connecting each wheel member to the fuselage,
      (3) means pivotally connecting each oleo strut system to the fuselage,
      (4) a lateral strut pivotally connected to each oleo strut system, and
   (D) wherein said second means includes:
      (1) a lateral member extending between and pivotally connected to the free ends of each lateral strut,
      (2) link members pivotally connecting opposite ends of said lateral member in pivotal relation from said fuselage, said link members, and said lateral member cooperate to form a four-bar linkage, and
      (3) spring and damper means operatively positioned between said lateral member and said fuselage to establish system roll mode stiffness and frequency.

4. In a helicopter having a fuselage and a lifting rotor projecting from said fuselage for rotation about an axis of rotation to generate lift, the improvement of:
   (A) a landing gear and suspension system connected to said fuselage and including,
      (1) first means to establish system vertical stiffness and damping, and
      (2) second means independent of said first means to establish system roll stiffness and damping
   (B) wherein said first means establishes system vertical stiffness and damping sufficient to attenuate landing impact loads and wherein said second means establishes system roll stiffness and damping sufficiently soft to avoid ground resonance instability,
   (C) wherein said first means comprises:
      (1) two wheel members on opposite sides of the fuselage,
      (2) an oleo strut system connecting each wheel member to the fuselage,
      (3) means pivotally connecting each oleo strut system to the fuselage,
      (4) a lateral strut pivotally connected to each oleo strut system, and
   (D) wherein said second means includes:
      (1) a lateral member extending between and pivotally connected to the free ends of each lateral strut,
      (2) link members pivotally connecting opposite ends of said lateral member in pivotal relation from said fuselage, said link members, and said lateral member cooperate to form a four-bar linkage, and
      (3) spring and damper means operatively positioned between said lateral member and said fuselage to establish system roll mode stiffness and frequency.

* * * * *